March 21, 1939.   H. T. SEELEY   2,151,160
CONTROL SYSTEM
Filed July 16, 1937
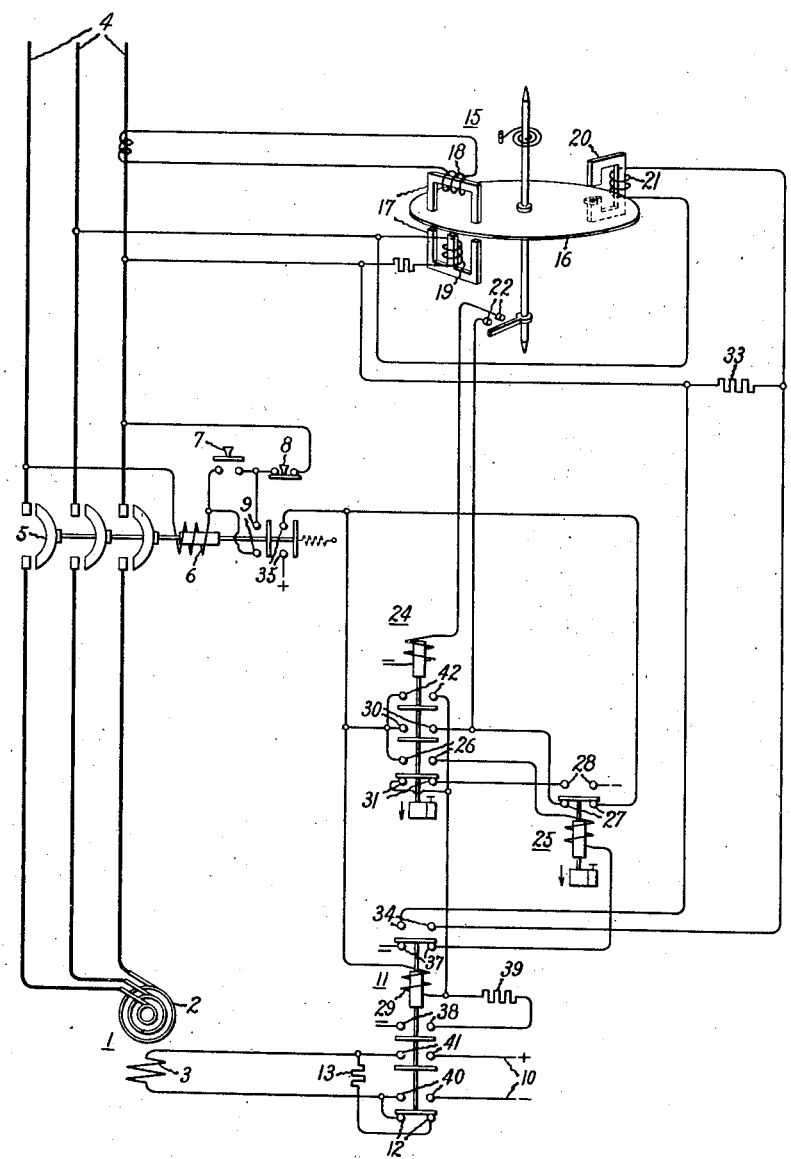
Inventor:
Harold T. Seeley,
by Harry E. Dunham
His Attorney.

Patented Mar. 21, 1939

2,151,160

UNITED STATES PATENT OFFICE 2,151,160

CONTROL SYSTEM

Harold T. Seeley, Lansdowne, Pa., assignor to General Electric Company, a corporation of New York Application July 16, 1937, Serial No. 153,953

13 Claims. (Cl. 172—289)

My invention relates to control systems for dynamo-electric machines and particularly to systems for controlling the field connections of a synchronous machine such as a synchronous motor.

One object of my invention is to provide an improved arrangement for effecting the connection of a field winding of a synchronous machine to a source of excitation when the speed of the machine increases above a predetermined value.

Another object of my invention is to provide an improved arrangement for effecting the connection of a synchronous motor field winding to a source of excitation in response to the frequency of pulsation and the magnitude of the current in the motor armature circuit and particularly an arrangement which is compensated for variations in the voltage of the alternating current supply circuit connected to the motor armature circuit.

Another object of my invention is to provide an improved arrangement for effecting the application of excitation to a synchronous motor when the speed thereof exceeds a predetermined value and for effecting the removal of excitation from the synchronous motor when the motor falls out of synchronism.

Another object of my invention is to provide an improved synchronous motor control arrangement of the type disclosed and claimed in the copending application of A. E. Anderson, Serial No. 745,744, filed September 27, 1934, and assigned to the same assignee as this application.

My invention will be better understood from the following description when taken in connection with the accompanying drawing, the single figure of which diagrammatically illustrates a synchronous motor control system, and its scope will be pointed out in the appended claims.

In the accompanying drawing, 1 represents a synchronous motor having an armature winding 2 and a field winding 3. In order to simplify the disclosure, I have shown my invention in connection with a full voltage starting system whereby the synchronous motor is started as an induction motor by connecting the motor armature winding directly to the alternating current supply circuit while the field winding of the motor is short-circuited through a suitable resistor. It is to be understood, however, that my invention is not limited to any particular arrangement for starting the motor. As shown in the drawing, the armature winding 2 is arranged to be connected directly to an alternating current supply circuit 4 by means of a suitable switch 5 having a closing coil 6 that is arranged to be connected across one phase of the supply circuit 4 when a suitable control switch 7 is closed. As shown in the drawing, the control switch 7 is manually operated, but it is obvious to those skilled in the art that it may be automatically controlled in any suitable manner so that it is closed when it is desired to start the motor 1. In the circuit of the closing coil 6, I also provide the normally closed contacts of a switch 8, which may be controlled in any suitable manner so that it is opened when it is desired to stop the motor. The switch 5, when closed, completes through its auxiliary contacts 9 a locking circuit for the closing coil 6 so that the starting control switch 7 may be opened without effecting the opening of the switch 5.

The field winding 3 of the motor 1 is arranged to be connected to a suitable source of excitation 10 by means of a field switch 11 when it is closed. When the switch 11 is open, its auxiliary contacts 12 connect a suitable discharge resistor 13 across the terminals of the field winding 3.

In accordance with the embodiment of my invention, shown in the drawing, I control the closing of the field switch 11 by means which depends for its operation upon the magnitude of current and on the frequency of the current pulsations produced in the motor armature circuit while the motor is operating out of synchronism as an induction motor, and control the opening of the field switch 11 by means which depends for its opeation on the magnitude and phase angle of armature current of the motor when it falls out of synchronism. These results are obtained in the arrangement shown in the drawing by a relay 15 which has a rotatable member 16 and a cooperating wattmetric driving element 17 that includes a current winding 18 energized in response to the current in one of the conductors supplying current to the motor armature winding 2 and a voltage winding 19 connected across one of the phases of the supply circuit 4. The driving element 17 exerts in one direction on the movable member 16 a torque proportional to $EI \sin(\theta - \phi)$, where $E$ represents the supply circuit voltage applied to the circuit of the voltage winding 19; $I$ represents the current in the supply circuit conductor to which the current winding 18 is connected; $\theta$ represents the phase angle by which $I$ lags behind $E$; and $\phi$ represents the angle by which the current in the voltage winding 19 lags in the voltage $E$. Therefore, the wattmetric device 17 produces a torque equal to $$E\frac{E}{(Z)}\sin(\theta-\phi)$$

or $$\frac{E^2}{Z}\sin(\theta-\phi)$$

where Z represents the impedance of the circuit through which the current I flows. On three-phase circuits it is advantageous to choose the connections so that $\theta=30°$ when the motor is operating at unity power factor.

Also, in accordance with my invention, I provide the rotatable member 16 with another driving element 20 which has a voltage winding 21 connected to one of the phases of the supply circuit 4 and which is designed so as to exert a torque on the rotatable element 16 in a direction opposite to the torque exerted by the wattmetric device 17. As shown in the drawing, the voltage winding 21 is connected in parallel with the voltage winding 19 of the wattmetric device 17 so that the opposing torque exerted by the driving element 20 is proportional to $KE^2$, where K represents a constant. Therefore, the resultant torque exerted on the movable element 16 by the two driving elements 17 and 20 is proportional to $$\frac{E^2}{Z}\sin(\theta-\phi)-KE^2$$

or $$E^2\left(\frac{\sin(\theta-\phi)}{Z}-K\right)$$

Since the relay has negligible spring restraint, its position depends mainly on the algebraic sign of $$\left(\frac{\sin(\theta-\phi)}{Z}-K\right)$$

Therefore, it will be seen that the operation of the relay 15 is not affected by normal changes in the magnitude of the supply circuit voltage.

When the torque of the wattmetric element 17 predominates, the movable member 16 is operated so as to effect the closing of the contacts 22 and thereby complete an energizing circuit for a relay 24. This relay 24 is designed in any suitable manner, examples of which are well known in the art, so that it moves instantaneously to its energized position when the winding of the relay is energized but does not return to its deenergized position until a predetermined time has elapsed after its winding is deenergized.

Associated with the relay 24 is an auxiliary time relay 25, an energizing circuit for which is arranged to be energized through contacts 26 of relay 24 when it is in its energized position and the field switch 11 is open. The relay 25 is similar in construction to the time relay 24 in that it operates substantially instantaneously when its winding is energized, but it does not move to its deenergized position until a predetermined time interval has elapsed after its winding is deenergized.

When energized, the relay 25 opens its contacts 27 which are in the original energizing circuit of the relay 24 and closes its contacts 28 which are in the energizing circuit of the closing coil 29 of the field switch 11. The opening of the contacts 27 of relay 25, however, does not effect the deenergization of the relay 24 as this relay, when energized, completes through its contacts 30 a shunt circuit around the contacts 27 of relay 25. The closing of the contacts 28 of relay 25 does not effect the energization of the closing coil 29 of the field switch 11 at this time as the circuit for this closing coil is open at the contacts 31 of relay 24 until the motor speed is above a predetermined value. Since the field switch 11 cannot close until both of the relays 24 and 25 have been energized and the relay 24 cannot be energized until the switch 5 has been closed and starting current has been supplied to the motor, it is evident that my improved control arrangement checks the continuity of the motor armature circuit and the presence of motor armature current before permitting the application of excitation to the motor field winding.

In order to remove excitation from the motor 1 when it falls out of synchronism, the relay 24, when energized, completes through its contacts 42 a short-circuit around the closing coil 29 of the field switch 11. Since the relay 24, when energized, operates substantially instantaneously, it effects the opening of the field switch 11 as soon as the magnitude and phase lag of the motor current reach such values as to cause the relay 15 to close the contacts 22. Therefore, the removal of excitation from the motor when it falls out of synchronism is effected independently of the frequency of the armature current pulsations whereas the application of excitation depends upon the length of time a current pulsation remains below a predetermined value and, therefore, depends upon the frequency of the current pulsation.

Since it may be desirable in some instances to recalibrate the relay 15 so that it operates in response to a different function of the product of the armature voltage and current for field removal, than for field application, I provide a resistor 33 in series with the winding 21 of relay 15 and contacts 34 on the field switch 11 for short-circuiting this resistor when the field switch 11 is closed. Therefore, it takes a larger value of $EI\sin(\theta-\phi)$ to close the contacts 22 for field removal than it does for application.

The operation of the embodiment of my invention shown in the drawing is as follows:

When it is desired to start the motor 1, the control switch 7 is closed to complete through the contacts of the control switch 8 an energizing circuit for the closing coil 6 of the switch 5. The closing of the switch 5 connects the armature winding 2 of the motor 1 directly across the supply circuit 4 so that the motor starts as an induction motor. At this time a circuit for the motor field winding 3 is completed through the discharge resistor 13 and the contacts 12 of the field switch 11. The motor armature current that flows, as soon as the switch 5 is closed, is of such a magnitude and phase as to cause the relay 15 to close immediately its contacts 22 and thereby complete an energizing circuit for the relay 24 through the contacts 27 of relay 25 and the contacts 35 on the switch 5. The relay 24 immediately moves to its energized position, and the closing of its contacts 30 completes a shunt circuit around the contacts 27 of the relay 25 so that the subsequent energization of the relay 25 does not effect the deenergization of relay 24. The closing of the contacts 26 of relay 24 completes an energizing circuit for relay 25 through contacts 35 on the switch 5 and contacts 37 on the field switch 11 so that the relay 25 immediately moves to its energized position. The closing of the contacts 28 of relay 25 prepares an energizing circuit for the closing coil 29 of the field switch 11, but this energizing circuit is open at this time at the contacts 31 of the energized relay 24.

As the motor accelerates as an induction motor, the motor armature current pulsates due to the cyclic changes in the reactance of the motor armature circuit caused by the salient poles of the motor rotor passing by the magnetic poles of the rotating field produced by the armature current. Since all of the rotor poles are alike before the field winding is excited, the pulsations in the armature current have a frequency equal to twice the frequency of induced field current at speeds above 75% synchronous speed. Until the motor reaches a predetermined speed, which depends upon the setting of the relay 15, the magnitude and phase of the motor armature current are such that the relay 15 maintains its contacts 22 continuously closed. When the motor speed increases above this predetermined value, the magnitude and phase of the motor armature current are such that, during a portion of each pulsation of the armature current, the relay 15 maintains its contacts 22 open and thereby interrupts the energizing circuit of the relay 24. However, the relay 24 does not move to its deenergized position until the motor speed has reached such a value that the frequency of the armature current pulsations is such that the duration of each half pulsation of current, during which the contacts 22 are open, is long enough to allow the relay 24 to drop out and thereby open its contacts 30 in its own holding circuit. The closing of the contacts 31 of relay 24 completes an energizing circuit for the closing coil 29 of the field switch 11 through the contacts 35 of switch 5 and contacts 28 of the relay 25. By closing its contacts 38, the field switch 11 completes through resistor 39 a shunt circuit around the contacts 31 of relay 24 and the contacts 28 of relay 25 so that the field switch remains closed after the relay 25 subsequently opens its contacts 28. By closing its main contacts 40 and 41, the field switch 11 connects the field winding 3 to the source of excitation 10 so that the field winding 3 is supplied with direct current and the motor pulls into synchronism. The opening of the contacts 12 of the field switch 11 disconnects the discharge resistor 13 from across the terminals of the field winding 3.

By opening its contacts 26, the relay 24 effects the deenergization of the relay 25 which, after a predetermined time interval, which is sufficiently long to permit the motor to pull into synchronism, opens its contacts 28 and closes its contacts 27. This time delay also insures that the relay 24 does not become energized due to the relay 15 momentarily closing its contacts 22 in response to a current disturbance produced in the motor armature circuit while the motor is pulling into synchronism.

By closing its contacts 34, the field switch 11 short-circuits the resistor 33 so that the impedance of the circuit of winding 21 of relay 15 is decreased and, therefore, the relay 15 responds to a different function of the motor armature voltage and current after the switch 11 closes.

As long as the motor continues to operate in synchronism with the voltage of the supply circuit 4, the phase relation between the armature current and voltage and the magnitude of the armature current are such that the relay 15 maintains its contacts 22 open. When, however, the motor falls out of synchronism, the power factor of the motor becomes sufficiently lagging and the current becomes sufficiently great to cause the relay 15 to close its contacts 22 and thereby complete the heretofore described energizing circuit for the relay 24. The relay 24 immediately moves to its energized position, and the closing of its contacts 42 completes a shunt circuit around the closing coil 29 of the field switch 11. The field switch 11 immediately moves to its open position thereby disconnecting the field winding 3 from the source of excitation 10 and reconnecting the discharge resistor 13 across the terminals of the field winding 3. The energization of the relay 24 and the closing of the contacts 37 of the field switch 11 also effect the completion of the energizing circuit of the relay 25.

The motor 1 continues to operate as an induction motor until the speed thereof again reaches a value sufficiently high to cause the relay 24 to move to its deenergized position and effect, in the manner heretofore described, the connection of the field winding 3 to the source of excitation 10.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current supply circuit, a synchronous motor having an armature winding connected to said supply circuit, a field winding for said motor, a source of excitation for said field winding, and means dependent upon the frequency of the current pulsations produced in the motor armature current when the motor is operating at a subsynchronous speed for controlling the connection of said source of excitation to said field winding including means dependent upon the magnitude of the armature current and means for compensating for changes in the magnitude of the armature current by changes in the voltage of said supply circuit.

2. In combination, an alternating current supply circuit, a synchronous motor having an armature winding connected to said supply circuit, a field winding for said motor, a source of excitation for said field winding, and means dependent upon the frequency of the current pulsations produced in the motor armature current when the motor is operating at a subsynchronous speed for controlling the connection of said source of excitation to said field winding including a movable member, means for exerting in one direction on said movable member a force proportional to a function of the motor armature current, means for exerting in the opposite direction on said movable member a force proportional to a function of the voltage of said supply circuit, and timing means controlled in accordance with the interval during which said movable member remains in a predetermined position.

3. In combination, an alternating current supply circuit, a synchronous motor having an armature winding connected to said supply circuit, a field winding for said motor, a source of excitation for said field winding, and means dependent upon the frequency of the current pulsations produced in the motor armature current when the motor is operating at a subsynchronous speed for controlling the connection of said source of excitation to said field winding including a movable member, means for exerting in one direction on said movable member a force proportional to a function of the product of the motor armature current and the supply circuit voltage, means for exerting in the opposite direction on said movable member a force proportional to a function of the voltage of said supply circuit, and timing means controlled in accordance with the interval during which said movable member remains in a predetermined position.

4. In combination, an alternating current supply circuit, a synchronous motor having an armature winding connected to said supply circuit, a field winding for said motor, a source of excitation for said field winding, and means dependent upon the frequency of the pulsations produced in a predetermined function of the product of the motor armature current and the supply circuit voltage when the motor is operating at a subsynchronous speed for controlling the connection of said source of excitation to said field winding including means for compensating said excitation controlling means for changes in the voltage of said supply circuit.

5. In combination, an alternating current supply circuit, a synchronous motor having an armature winding connected to said supply circuit, a field winding for said motor, a source of excitation for said field winding, and means dependent upon the frequency of the current pulsations produced in the motor armature current when the motor is operating at a subsynchronous speed for controlling the connection of said source of excitation to said field winding including a movable member, means for exerting in one direction on said movable member a force proportional to a function of the motor armature current, means for exerting in the opposite direction on said movable member a force proportional to a function of the voltage of said supply circuit, a timing device, means controlled by the position of said movable member for initiating the operation of said timing device, and means responsive to the operation of said timing device for effecting the connection of said source of excitation to said field winding.

6. In combination, an alternating current supply circuit, a synchronous motor having an armature winding connected to said supply circuit, a field winding for said motor, a source of excitation, a switch for connecting said source of excitation to said field winding, and means for controlling the operation of said switch including a movable member, means for exerting in one direction on said movable member a force proportional to a function of the motor armature current, means for exerting in the opposite direction on said movable member a force proportional to a function of the supply circuit voltage, and means dependent upon the position of said field switch for varying the force produced on said movable member by said force producing means which exerts a force proportional to a function of said supply circuit voltage.

7. In combintion, an alternating current supply circuit, a synchronous motor having an armature winding connected to said supply circuit, a field winding for said motor, a source of excitation, a field switch for connecting said source to said field winding, and means for effecting the closing of said field switch when the motor speed is above a predetermined value and for opening said field switch when the motor falls out of synchronism including a movable member, means for exerting a force in one direction on said movable member, said means including a current winding connected in series relation with said motor armature winding, means including a voltage winding energized from said supply circuit for exerting a force in the opposite direction on said movable member, and means responsive to the closing of said field switch for changing the electrical constants of the circuit of said voltage winding of said force producing means.

8. In combintion, an alternating current supply circuit, a synchronous motor having an armature winding connected to said supply circuit, a field winding for said motor, a source of excitation, a field switch for connecting said source to said field winding, and means for effecting the closing of said field switch when the motor speed is above a predetermined value and for opening said field switch when the motor falls out of synchronism including a movable member, a wattmetric device for exerting a force in one direction on said movable member, said device having a voltage winding energized from said supply circuit and a current winding connected in series relation with one phase of said motor armature winding, a device including a voltage winding energized from one phase of said supply circuit for exerting a force in the opposite direction on said movable member, and means responsive to the closing of said field switch for changing the electrical constants of the circuit of said last mentioned voltage winding.

9. In a system including an alternating current supply circuit connected to a synchronous machine of the type in which pulsations are produced in the armature current thereof when the machine is operating as an induction motor at subsynchronous speeds near synchronous speed, means dependent upon the frequency of said armature current pulsations for establishing a predetermined electrical connection of said machine including means dependent upon a predetermined characteristic of the motor armature current, and means for compensating said frequency dependent means for changes produced in said characteristic of the amature current by changes in the voltage of said supply circuit.

10. In a system including an armature current supply circuit connected to a synchronous machine of the type in which pulsations are produced in the armature current thereof when the machine is operating as an induction motor at subsynchronous speeds near synchronous speed, means dependent upon the frequency of said armature current pulsations for establishing a predetermined electrical connection of said machine including means dependent upon the magnitude and phase of the motor armature current, and means for compensating said frequency dependent means for changes produced in the magnitude of the armature current by changes in the voltage of said supply circuit.

11. In a system including an armature current supply circuit connected to a synchronous machine of the type in which pulsations are produced in the armature current thereof when the machine is operating as an induction motor at subsynchronous speeds near synchronous speed, means dependent upon the frequency of the pulsations produced in a predetermined function of the product of the motor armature current and the supply circuit voltage for establishing a predetermined electrical connection of said machine including means for compensating said electrical connection controlling means for changes in the voltage of said supply circuit.

12. In a system including an armature current supply circuit connected to a synchronous machine of the type in which pulsations are produced in the armature current thereof when the machine is operating as an induction motor at subsynchronous speeds near synchronous speed, means for establishing a predetermined electrical connection of said machine including a movable member, means for exerting on said movable member a force proportional to a function of the motor armature current, means for exerting on said movable member a force proportional to a function of the supply circuit voltage, and means responsive to a predetermined movement of said movable member for establishing said predetermined electrical connection and for causing said last-mentioned force-exerting means to exert on said movable member a force proportional to a different function of the supply circuit voltage.

13. In a system including an armature current supply circuit connected to a synchronous machine of the type in which pulsations are produced in the armature current thereof when the machine is operating as an induction motor at subsynchronous speeds near synchronous speed, means for establishing a predetermined electrical connection of said machine including a movable member, means for exerting on said movable member a force proportional to a function of the product of the motor armature current and the supply circuit voltage, means for exerting on said movable member another force proportional to a function of the supply circuit voltage, and means responsive to a predetermined movement of said movable member for establishing said predetermined electrical connection of said machine and for varying the connections of one of said force-exerting means so as to change the force exerted thereby.

HAROLD T. SEELEY.